US011711039B2

(12) United States Patent
Takahashi et al.

(10) Patent No.: US 11,711,039 B2
(45) Date of Patent: Jul. 25, 2023

(54) MOTOR DRIVE APPARATUS

(71) Applicant: Mitsubishi Electric Corporation, Tokyo (JP)

(72) Inventors: Kenji Takahashi, Tokyo (JP); Shinya Toyodome, Tokyo (JP); Mitsuo Kashima, Tokyo (JP); Tomohiro Kutsuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/770,638

(22) PCT Filed: Dec. 3, 2019

(86) PCT No.: PCT/JP2019/047270
§ 371 (c)(1),
(2) Date: Apr. 21, 2022

(87) PCT Pub. No.: WO2021/111527
PCT Pub. Date: Jun. 10, 2021

(65) Prior Publication Data
US 2022/0368255 A1  Nov. 17, 2022

(51) Int. Cl.
F25B 49/02 (2006.01)
H02P 21/18 (2016.01)
(Continued)

(52) U.S. Cl.
CPC .......... H02P 21/18 (2016.02); H02P 21/0089 (2013.01); H02P 21/22 (2016.02)

(58) Field of Classification Search
CPC ...... H02P 21/18; H02P 21/22; H02P 21/0089; H02P 27/085; F25B 49/025
See application file for complete search history.

(56) References Cited

U.S. PATENT DOCUMENTS 10,742,151 B2   8/2020  Taniguchi et al.
2010/0148707 A1  6/2010  Tobari et al.
(Continued)

FOREIGN PATENT DOCUMENTS

JP  6-113591 A    4/1994
JP  5256009 B2    8/2013
JP  2018-42324 A  3/2018

OTHER PUBLICATIONS

International Search Report and Written Opinion dated Feb. 18, 2020, received for PCT Application PCT/JP2019/047270, Filed on Dec. 3, 2019, 9 pages including English Translation.
(Continued)

Primary Examiner — Cortez M Cook
(74) Attorney, Agent, or Firm — Xsensus LLP

(57) ABSTRACT

A motor drive apparatus includes: a dq-axis current controller converting phase current flowing through a synchronous motor into d-axis current and q-axis current, and controlling the phase current by determining a voltage command based on the d-axis current and a d-axis current command as well as the q-axis current and a q-axis current command; a voltage amplitude calculating unit obtaining voltage amplitude; a speed controller controlling rotational speed of the motor by determining the q-axis current command based on a speed command, the rotational speed, and a speed droop amount that reduces the speed command; a flux weakening controller performing flux control to limit amplitude of voltage output to the motor by determining the d-axis current command based on the voltage amplitude and a first voltage limit value; and a speed droop controller controlling the speed droop amount based on the voltage amplitude and a second voltage limit value.

16 Claims, 12 Drawing Sheets

(51) Int. Cl.
*H02P 21/22* (2016.01)
*H02P 21/00* (2016.01)

(56) References Cited

U.S. PATENT DOCUMENTS

2019/0097559 A1* 3/2019 Li ..................... F25B 49/025
2019/0199260 A1 6/2019 Taniguchi et al.
2020/0403548 A1* 12/2020 Hatakeyama ......... H02P 27/085

OTHER PUBLICATIONS

Indian Office Action dated Oct. 12, 2022, in corresponding Indian Patent Application No. 202227030599, 5 pp.

* cited by examiner

MOTOR DRIVE APPARATUS

CROSS-REFERENCE TO RELATED APPLICATION

The present application is based on PCT filing PCT/JP2019/047270, filed Dec. 3, 2019, the entire contents of which is incorporated herein by reference.

FIELD

The present invention relates to a motor drive apparatus that drives a synchronous motor.

BACKGROUND

A servo system using a synchronous motor is used as a power source for various mechanical devices. In a general servo system, a speed controller and a current controller are connected in series. A limiter is provided at the output of each controller to protect the synchronous motor and the mechanical device. Moreover, in general, a power converter that outputs an alternating current voltage to the synchronous motor has a limit on the maximum voltage that can be output or a limit on the maximum current that can be output. Such a limit of the power converter also functions similarly to the limiter.

Each controller is provided with an integrator to control the output so as to eliminate a steady-state error. When the output of each controller is saturated by the limiter, and the integrated value becomes excessive by continuing the integration, a windup phenomenon is known to occur in which the output value does not change from the limit value even if a command value changes. The windup phenomenon may excite sustained oscillation. The windup phenomenon causes a reduction in the stability of control by the servo system. As one method of preventing the windup phenomenon, when it is detected that the output of each controller is saturated, the command value input to each controller can be lowered such that the saturation is released.

Patent Literature 1 discloses a control method that is related to a speed control device of a motor and that reduces a speed command value when an output voltage of a power converter reaches an upper limit to result in saturation of the output voltage. When the output voltage of the power converter is saturated, the speed control device according to Patent Literature 1 performs voltage phase control such that the phase of a voltage command value becomes a lead phase with respect to dq rotating coordinates, and reduces the speed command value by performing calculation that corrects the speed command value when the phase angle of the voltage command value is determined to have exceeded a threshold.

CITATION LIST

Patent Literature

Patent Literature 1: Japanese Patent No. 5256009

SUMMARY

Technical Problem

When the control method described in Patent Literature 1 is applied, a motor drive apparatus can prevent the occurrence of the windup phenomenon by appropriately adjusting control parameters. However, according to the control method described in Patent Literature 1, many control parameters need to be adjusted. In addition, a servo system or plant model includes many non-linear elements that exhibit complex characteristics. Thus, according to the control method described in Patent Literature 1, the motor drive apparatus adjusts the control parameters by trial and error and thus is problematic in terms of a heavy workload required for the adjustment to perform stable control on the motor.

The present invention has been made in view of the above, and an object of the present invention is to provide a motor drive apparatus capable of reducing a workload required for an adjustment to perform stable control on a motor.

Solution to Problem

In order to solve the above-described problem and achieve the object, a motor drive apparatus according to the present invention includes: a current controller to convert a value of a phase current flowing through a motor into values of a d-axis current and a q-axis current that are currents in a dq coordinate system, and control the phase current by determining a voltage command on the basis of the d-axis current and a d-axis current command as well as the q-axis current and a q-axis current command; a voltage amplitude calculating unit to obtain a voltage amplitude that is an amplitude of the voltage command; a speed controller to control a rotational speed of the motor by determining the q-axis current command on the basis of a speed command, the rotational speed, and a speed droop amount that reduces the speed command; a flux weakening controller to perform flux control to limit an amplitude of a voltage output to the motor, by determining the d-axis current command on the basis of the voltage amplitude and a first voltage limit value; and a speed droop controller to control the speed droop amount on the basis of the voltage amplitude and a second voltage limit value. The speed droop controller determines the speed droop amount that makes the voltage amplitude smaller than the second voltage limit value.

Advantageous Effects of Invention

According to the present invention, the motor drive apparatus has an effect that the workload required for the adjustment to perform stable control on the motor can be reduced.

DESCRIPTION OF EMBODIMENTS

A motor drive apparatus according to embodiments of the present invention will now be described in detail with reference to the drawings. Note that the present invention is not limited to the embodiments.

First Embodiment

Figure 1:
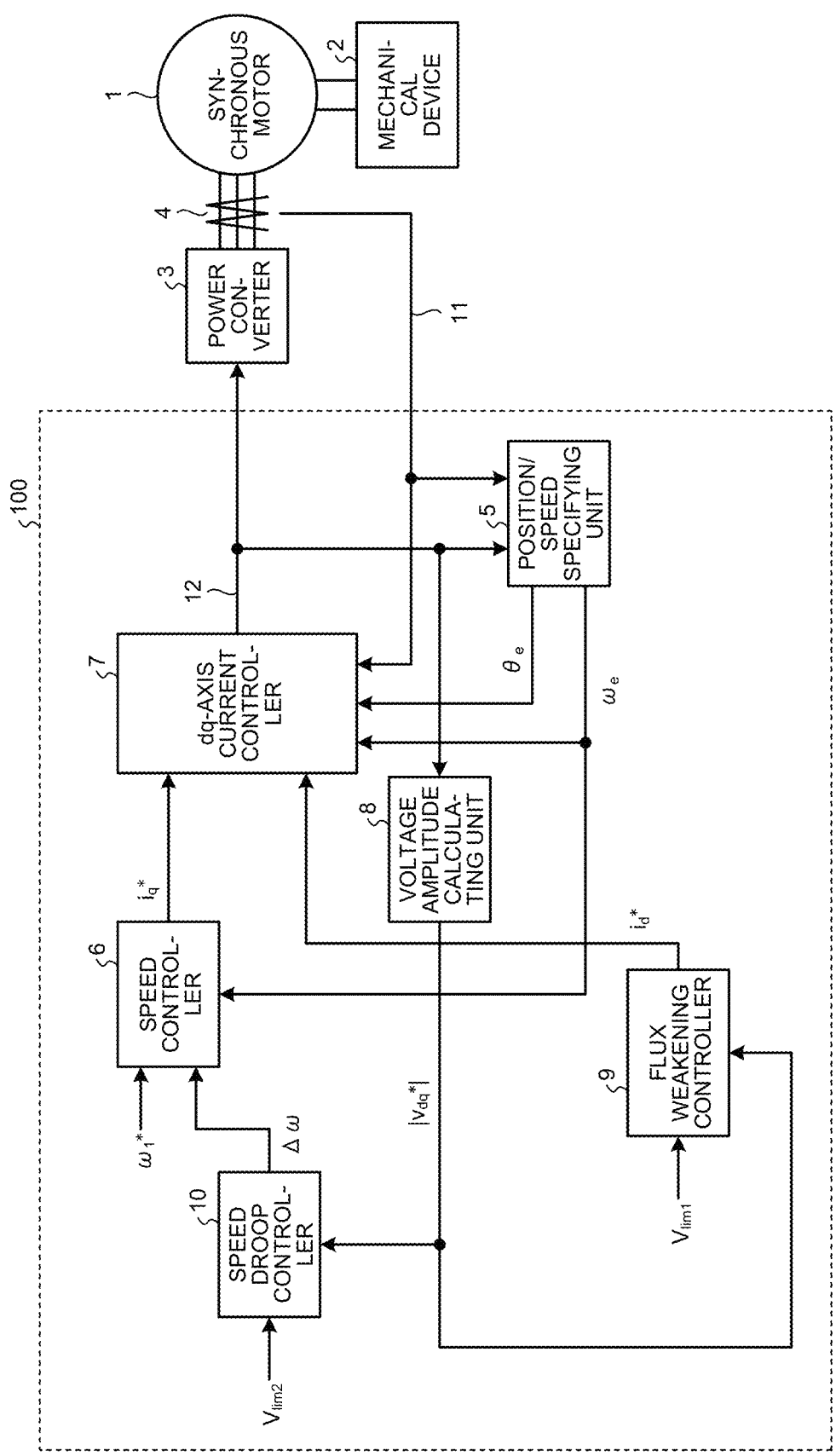
FIG. 1 is a block diagram illustrating an example of a configuration of a motor drive apparatus according to a first embodiment of the present invention.

FIG. 1 is a block diagram illustrating an example of a configuration of a motor drive apparatus according to a first embodiment of the present invention. A motor drive apparatus 100 according to the first embodiment drives a synchronous motor 1. The motor drive apparatus 100 is connected to a power converter 3. The synchronous motor 1 is mechanically connected to a mechanical device 2. The synchronous motor 1 is a power source for the mechanical device 2. The mechanical device 2 operates when the power converter 3 outputs an alternating current voltage to the synchronous motor 1. The synchronous motor 1, the power converter 3, and the motor drive apparatus 100 make up a motor system that drives the synchronous motor 1.

In the first embodiment, the synchronous motor 1 is a permanent magnet synchronous motor in which a permanent magnet is provided on a rotor. The synchronous motor 1 may be a wound field synchronous motor in which a field winding is wound around a rotor, or may be a reluctance synchronous motor that obtains rotational torque by utilizing saliency of a rotor. The arrangement of the permanent magnet in the synchronous motor 1 may be of an embedded type or a surface type. In the first embodiment, the synchronous motor 1 is assumed to be a three-phase synchronous motor. The synchronous motor 1 may be a synchronous motor other than the three-phase synchronous motor. For example, the synchronous motor 1 may be a two-phase synchronous motor or a five-phase synchronous motor.

The mechanical device 2 need only be a device that operates when the synchronous motor 1 is driven. In the first embodiment, the mechanical device 2 is assumed to be a refrigerant compressor that is a typical example of an application whose control adjustment tends to take time. The refrigerant compressor is incorporated into an appliance such as an air conditioner, a chiller, or a refrigerator. Many refrigerant compressors include an integrated structure in which a motor is incorporated in order to reduce the number of parts. Thus, in many refrigerant compressors, it is difficult to perform the control adjustment by the motor alone. Moreover, the refrigerant compressor has a pressure condition that changes gradually with respect to time, and thus takes time for the pressure to stabilize. Since it takes time for the pressure to stabilize, the control adjustment of the refrigerant compressor tends to take a long time.

The refrigerant compressor includes various types of compressors such as a rotary compressor, a scroll compressor, a screw compressor, a reciprocal compressor, and a turbo compressor. It is common for any type of refrigerant compressor to require complicated control adjustment. The refrigerant compressor as the mechanical device 2 may be any of the various types of compressors. The mechanical device 2 may be a device other than the refrigerant compressor.

The power converter 3 converts power input from a power source (not illustrated) into power of a prescribed form, and outputs the power. In the first embodiment, the power converter 3 is assumed to be a general-purpose voltage source inverter. The voltage source inverter is a device that switches and converts a direct current voltage supplied from a direct current voltage source into a desired alternating current voltage. The power converter 3 converts the direct current voltage into the alternating current voltage on the basis of a voltage command 12 output from the motor drive apparatus 100, and outputs the alternating current voltage obtained by the conversion to the synchronous motor 1. Note that the power converter 3 may be another type of circuit such as a current source inverter or a matrix converter, or may be a multi-level converter as long as desired alternating current power can be supplied to the synchronous motor 1.

A current detection unit 4 detects a phase current flowing through the synchronous motor 1. The type, arrangement, and the like of the current detection unit 4 are not particularly limited. The current detection unit 4 may be a current sensor of a type using a transformer called a current transformer (CT), or may be a current sensor of a type using a shunt resistor. The current detection unit 4 may use a combination of the CT and the shunt resistor. The current detection unit 4 illustrated in FIG. 1 is disposed at a wiring between the synchronous motor 1 and the power converter 3, and measures the phase current flowing through the synchronous motor 1. The current detection unit 4 outputs a signal 11 indicating the value of the phase current. Note that the current detection unit 4 may be disposed at a position other than the position illustrated in FIG. 1. For example, the current detection unit 4 may be disposed inside the power converter 3.

In a case where the current detection unit 4 is disposed inside the power converter 3, the current detection method that can be used includes a one-shunt current detection method in which a shunt resistor is disposed on an N side of a direct-current bus of the power converter 3, a lower-arm shunt current detection method in which a shunt resistor is inserted in series with a lower arm of the power converter 3, or the like. As compared to the case of using the CT, the one-shunt current detection method and the lower-arm shunt current detection method have a limit on the timing at which the current can be detected, but can reduce the component cost.

In a case where the synchronous motor 1 is a three-phase synchronous motor, on the basis of Kirchhoff's current law, the motor drive apparatus 100 uses the value of the phase current of any two of the three phases to be able to calculate the value of the phase current of the other one phase. Therefore, the current sensor need only be disposed for any two of the three phases, and need not be disposed for the other one phase.

The motor drive apparatus 100 controls the synchronous motor 1 by vector control. The motor drive apparatus 100 includes a position/speed specifying unit 5, a speed controller 6, a dq-axis current controller 7, a voltage amplitude calculating unit 8, a flux weakening controller 9, and a speed droop controller 10.

In order to perform vector control on the synchronous motor 1, a magnetic pole position $\theta_e$ and a rotational speed $\omega_e$ of the synchronous motor 1 need to be detected or estimated. The position/speed specifying unit 5 specifies the magnetic pole position $\theta_e$ and the rotational speed $\omega_e$ of the synchronous motor 1. Specifically, the position/speed specifying unit 5 estimates the magnetic pole position $\theta_e$ and the rotational speed $\omega_e$ on the basis of the voltage command 12 output from the dq-axis current controller 7 and the value of the phase current detected by the current detection unit 4. The position/speed specifying unit 5 outputs the specified magnetic pole position $\theta_e$ and the specified rotational speed $\omega_e$.

A position sensor that detects the magnetic pole position $\theta_e$ may be attached to the synchronous motor 1. A rotary encoder or resolver is used as the position sensor. Instead of the position sensor, a speed sensor such as a tachogenerator may be attached to the synchronous motor 1. Note that the use of the position sensor or the speed sensor may not be suitable for the synchronous motor 1 due to restrictions such as use environment and cost. In the first embodiment, the motor drive apparatus 100 is assumed to perform position sensorless control. The motor drive apparatus 100 is not limited to the one in which the position sensor or the speed sensor is not used, and may be one in which the position sensor or the speed sensor is used. Note that the refrigerant compressor described above is a typical example of an application in which the position sensor or the speed sensor is not readily used.

Various methods have been proposed regarding the position sensorless control of the synchronous motor 1, and the first embodiment may basically use any method. As a known method, for example, a speed estimation method is available in which a state quantity of the synchronous motor 1 is estimated by a state observer, and the rotational speed $\omega_e$ is adaptively identified using an estimation error of the state quantity. This method is a method called an adaptive observer, and has an advantage in that speed estimation robust to a change in an induced voltage constant can be performed. When the adaptive observer is not used, the magnetic pole position $\theta_e$ may be estimated simply from an arctangent of a speed electromotive force. This method is called an arctangent method. The arctangent method has a disadvantage in that an error occurs in speed estimation when the induced voltage constant has an error, but involves simpler calculations than the adaptive observer. Many other position sensorless control methods have been proposed, and any method may be used as long as the magnetic pole position $\theta_e$ and the rotational speed $\omega_e$ can be estimated.

The speed controller 6 controls the rotational speed $\omega_e$ of the synchronous motor 1 by determining a q-axis current command $i_q^*$ on the basis of a speed command $\omega_1^*$ that is a first speed command, a speed droop amount $\Delta\omega$, and the specified rotational speed $\omega_e$.

Figure 2:
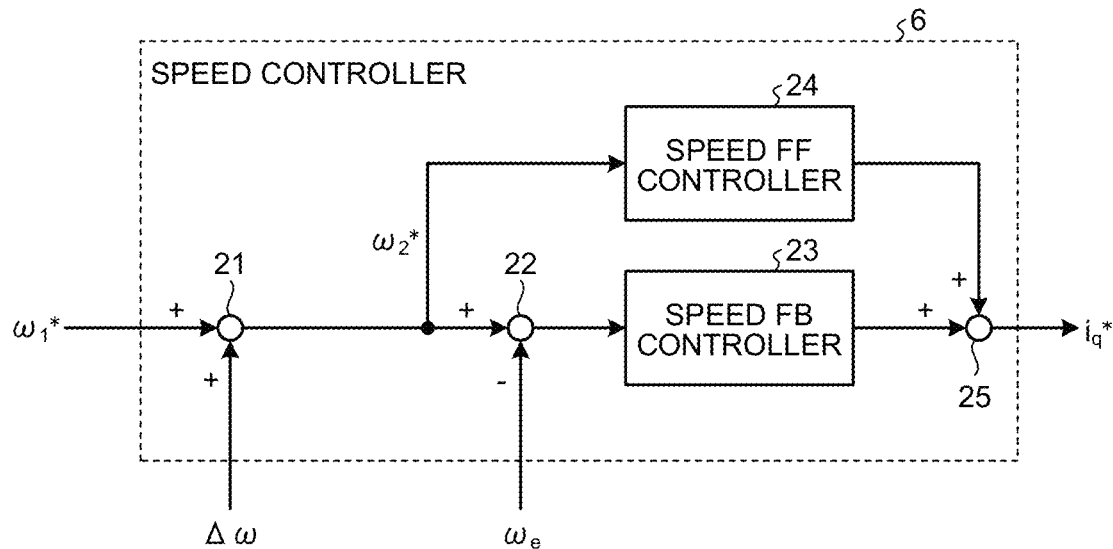
FIG. 2 is a block diagram illustrating an example of a configuration of a speed controller included in the motor drive apparatus according to the first embodiment.

FIG. 2 is a block diagram illustrating an example of a configuration of the speed controller included in the motor drive apparatus according to the first embodiment.

The speed controller 6 includes adders 21 and 25, a subtractor 22, a speed feedback (FB) controller 23, and a speed feedforward (FF) controller 24.

The speed command $\omega_1^*$ is input to the speed controller 6 from outside the motor drive apparatus 100. The speed command $\omega_1^*$ may be obtained by calculation in the motor drive apparatus 100. The speed command $\omega_1^*$ and the speed droop amount $\Delta\omega$ are input to the adder 21. The adder 21 adds up the speed command $\omega_1^*$ and the speed droop amount $\Delta\omega$, and outputs a second speed command $\omega_2^*$ that is an added result. The speed droop amount $\Delta\omega$ will be described later. The second speed command $\omega_2^*$ and the rotational speed $\omega_e$ are input to the subtractor 22. The subtractor 22 outputs a difference between the second speed command $\omega_2^*$ and the rotational speed $\omega_e$. The speed FB controller 23 performs FB control such that the difference input from the subtractor 22 equals zero.

As the speed FB controller 23, a proportional integral (PI) controller is used. It is known in the PI controller that a steady-state error with respect to a step response equals zero. The use of the PI controller facilitates the gain design. As the speed FB controller 23, a controller based on a control rule other than PI control may be used. In order to achieve zero steady-state error, a controller having an integrator is used for the speed FB controller 23. The speed FF controller 24 is connected in parallel to the speed FB controller 23. The second speed command $\omega_2^*$ is input to the speed FF controller 24. The speed FF controller 24 performs FF control on the rotational speed $\omega_e$. With the speed FF controller 24 provided, the speed controller 6 can accelerate a control response. The adder 25 generates the q-axis current command $i_q^*$ by adding up an output value of the speed FB controller 23 and an output value of the speed FF controller 24.

A d-axis current command $i_d^*$ is determined by the flux weakening controller 9. The speed controller 6 may determine the d-axis current command $i_d^*$ by "maximum torque per ampere control (MTPA)". The d-axis current command $i_d^*$ will be described later.

The dq-axis current controller 7 as a current controller controls the phase current flowing through the synchronous motor 1. As the dq-axis current controller 7, a vector controller that performs vector control on dq rotating coordinates is used. A typical vector controller performs current control on the dq rotating coordinates with respect to the magnetic pole position $\theta_e$. When the phase current is converted into a value on the dq rotating coordinates, an alternating current value is converted into a direct current value that makes the control easy, whereby the motor drive apparatus 100 performs the current control on the dq rotating coordinates. Since the coordinate transform requires information on the magnetic pole position $\theta_e$, the magnetic pole position $\theta_e$ specified by the position/speed specifying unit 5 is input to the dq-axis current controller 7.

The dq-axis current controller 7 performs the coordinate transform to convert the value of the phase current into a value of a d-axis current and a value of a q-axis current that are currents in a dq coordinate system. The dq-axis current controller 7 also determines the voltage command 12 on the basis of the d-axis current and the d-axis current command $i_d$* as well as the q-axis current and the q-axis current command $i_q$*. The dq-axis current controller 7 adjusts a d-axis voltage command such that the d-axis current matches the d-axis current command $i_d$*. The dq-axis current controller 7 adjusts a q-axis voltage command such that the q-axis current matches the q-axis current command $i_q$*. The dq-axis current controller 7 thus determines the voltage command on the dq rotating coordinates.

The dq-axis current controller 7 includes a PI controller (not illustrated) that performs FB control on the d-axis current, a PI controller (not illustrated) that performs FB control on the q-axis current, and a non-interacting controller (not illustrated) that performs FF compensation on an interacting component of the dq axis. If the d-axis current can properly follow the d-axis current command $i_d$* and the q-axis current can properly follow the q-axis current command $i_q$*, a method other than the method described above may be used as the control method of the dq-axis current controller 7.

The dq-axis current controller 7 performs the coordinate transform from the voltage command on the dq rotating coordinates to a value of three-phase stationary coordinates on the basis of the magnetic pole position $\theta_e$. The dq-axis current controller 7 outputs the voltage command 12 on the three-phase stationary coordinates to the power converter 3.

The voltage amplitude calculating unit 8 obtains a voltage amplitude that is the amplitude of the voltage command. The amplitude of the voltage command is also referred to as the norm of a voltage command vector or the absolute value of the voltage command vector. Various methods can be considered as a method of calculating the amplitude of the voltage command. The voltage amplitude calculating unit 8 calculates the amplitude of the voltage command by, for example, the calculation expressed in the following expression (1). The voltage amplitude calculating unit 8 outputs a result of the calculation of the voltage amplitude.

[Expression 1]

$$|v_{dq}*| = \sqrt{(v_d*)^2 + (v_q*)^2} \ldots \quad (1)$$

In the expression, $|v_{dq}*|$ represents the voltage amplitude, "$v_d$*" represents the d-axis voltage command, and "$v_q$*" represents the q-axis voltage command. When the voltage amplitude calculating unit 8 performs the calculation of expression (1), the voltage commands $v_d$* and $v_q$* on the dq rotating coordinates are input to the voltage amplitude calculating unit 8 from the dq-axis current controller 7.

Note that the voltage amplitude calculating unit 8 may calculate a modulation factor instead of the voltage amplitude $|v_{dq}*|$. The modulation factor is a standardization of the voltage amplitude $|v_{dq}*|$ in order to evaluate how large the voltage amplitude $|v_{dq}*|$ is with respect to the output limit of the power converter 3. The voltage amplitude calculating unit 8 calculates the modulation factor "M" by calculation expressed in the following expression (2).

[Expression 2]

$$M = \frac{|v_{dq}^*|}{V_{DC}/\sqrt{2}} \quad (2)$$

In the expression, "$V_{DC}$" represents a direct current bus voltage of the voltage source inverter as the power converter 3. The direct current bus voltage is detected by a direct current bus voltage detector. The direct current bus voltage detector is not illustrated. A voltage region in which the modulation factor obtained by expression (2) is smaller than one is called an inverter linear region. A voltage region in which the modulation factor obtained by expression (2) is larger than one is called an overmodulation region or a voltage saturation region.

The flux weakening controller 9 performs flux control for controlling the amplitude of the voltage output to the synchronous motor 1 by determining the d-axis current command $i_d$* on the basis of the voltage amplitude $|v_{dq}*|$ and a first voltage limit value $V_{lim1}$. The speed droop controller 10 controls the speed droop amount $\Delta\omega$ on the basis of the voltage amplitude $|v_{dq}*|$ and a second voltage limit value $V_{lim2}$. Here, the details of the flux weakening controller 9 and the speed droop controller 10 will be described.

Figure 3:
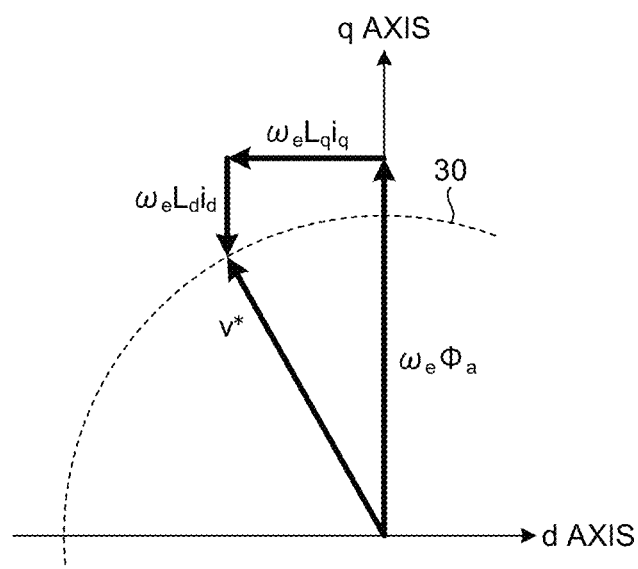
FIG. 3 is a diagram for explaining a voltage vector representing a voltage state of a synchronous motor to be controlled by the motor drive apparatus according to the first embodiment.

FIG. 3 is a diagram for explaining a voltage vector representing a voltage state of the synchronous motor to be controlled by the motor drive apparatus according to the first embodiment. FIG. 3 illustrates the voltage vector when the synchronous motor 1 as an embedded permanent magnet synchronous motor rotates in the high-speed region. In the high-speed region, a voltage drop due to coil resistance of the synchronous motor 1 is often negligible, so that the voltage drop due to the coil resistance is omitted in FIG. 3. FIG. 3 illustrates the voltage vector in a steady state and omits a transient term.

In the synchronous motor 1, as the rotational speed $\omega_e$ increases, a speed electromotive force $\omega_e \Phi_a$ increases. Here, "$\Phi_a$" represents a dq-axis flux linkage and is a value unique to the motor. The speed electromotive force $\omega_e \Phi_a$ is generated in the direction of the q-axis. In the permanent magnet synchronous motor, the q-axis current and magnet torque of the motor are proportional to each other. The synchronous motor 1 normally outputs torque to cause the mechanical device 2 to perform some mechanical work. The q-axis current $i_q$ flows through the synchronous motor 1, and a voltage $\omega_e L_q i_q$ is generated in the direction of the d-axis by armature reaction of the q-axis current $i_q$. Here, "$L_q$" represents a q-axis inductance.

On the other hand, the d-axis current $i_d$ contributes to a small extent to the torque, and thus is controlled to a smaller value in a low-middle speed region, in which the rotational speed is slower than that in the high-speed region, than in the high-speed region. As a known method of determining the d-axis current command $i_d$* in the low-middle speed region, a method such as $i_d$=0 control or MTPA is available.

Generally, there is a limit to the maximum alternating current voltage that the power converter 3 can output to the synchronous motor 1. In the high-speed region, a vector sum of the speed electromotive force $\omega_e \Phi_a$ and the voltage $\omega_e L_q i_q$ may exceed the maximum output voltage of the power converter 3, and a method called flux weakening control needs to be used.

When the dq-axis voltage has a limit value of "$V_{om}$", the limit value $V_{om}$ satisfies a relationship of the following expression (3), which is an approximate equation, in the high-speed region. Note that strictly speaking, the output limit range of the power converter 3 has a hexagonal shape, but is approximated to a circle here. Although the discussion in the first embodiment assumes the approximation to a circle, it is needless to say that the discussion may be made by assuming exactly a hexagon.

[Expression 3]

$$(\Phi_a + L_d i_d)^2 + (L_q i_q)^2 \cong \left(\frac{V_{om}}{\omega_e}\right)^2 \quad (3)$$

In the first embodiment, a circle whose radius centered on the origin is the limit value $V_{om}$ is referred to as a voltage limit circle 30. Note that the limit value $V_{om}$ is known to vary depending on the value of the direct current bus voltage in a case where the power converter 3 is a pulse width modulation (PWM) inverter.

The speed electromotive force $\omega_e \Phi_a$ is very large in the high-speed region; therefore, in order to increase the q-axis current $i_q$, it is necessary to pass the d-axis current $i_d$ in a negative direction and to keep the amplitude of a voltage command vector v* within the range of the voltage limit circle 30. As described above, the method of control that reduces the voltage amplitude by generating a d-axis stator flux $L_d i_d$ in the direction opposite to the dq-axis flux linkage $\Phi_a$ is generally called flux weakening control. Here, "$L_d$" represents a d-axis inductance.

The simplest method of flux weakening control is a method of determining the d-axis current command $i_d$* on the basis of a voltage equation. By solving the above expression (3) for the d-axis current $i_d$, the following expression (4) can be obtained.

[Expression 4]

$$i_d = \frac{-\Phi_a \pm \sqrt{\left(\frac{V_{om}}{\omega_e}\right)^2 - (L_q i_q)^2}}{L_d} \quad (4)$$

However, the flux weakening control that obtains the d-axis current $i_d$ on the basis of the above expression (4) has a disadvantage in that it is sensitive to a change, variation, or the like of a motor constant, and is not used often in the industry.

Integral flux weakening control is known as one method used instead of the flux weakening control based on the above expression (4). For example, a method is known in which the d-axis current command $i_d$* is determined by performing integral control on a difference between the voltage amplitude $|v_{dq}*|$ and the first voltage limit value $V_{lim1}$. In the following description, such a method may be referred to as "d-axis current command-manipulating flux weakening control".

Figure 4:
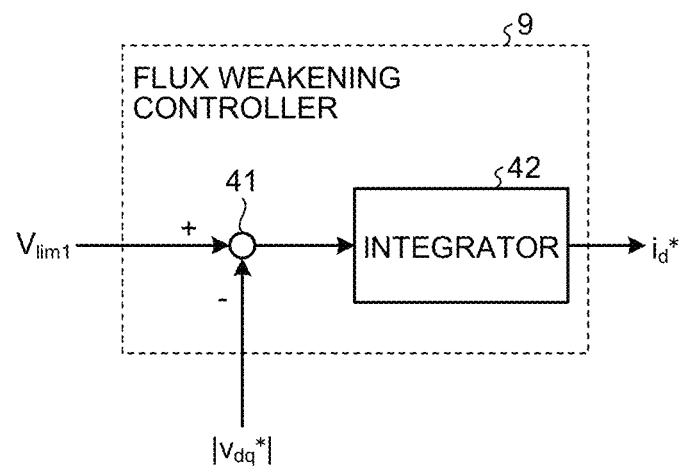
FIG. 4 is a block diagram illustrating an example of a configuration of a flux weakening controller included in the motor drive apparatus according to the first embodiment.

FIG. 4 is a block diagram illustrating an example of a configuration of the flux weakening controller included in the motor drive apparatus according to the first embodiment. The flux weakening controller 9 includes a subtractor 41 and an integrator 42 with a limiter. The subtractor 41 outputs a difference obtained by subtracting the voltage amplitude $|v_{dq}*|$ from the first voltage limit value $V_{lim1}$. The integrator 42 obtains the d-axis current command $i_d$* by integrating a result of multiplying the difference by a control gain (not illustrated). Since the flux weakening controller 9 is a controller that integrates the difference between the first voltage limit value $V_{lim1}$ and the voltage amplitude $|v_{dq}*|$, the motor drive apparatus 100 can automatically adjust the d-axis current command $i_d$* to an appropriate value that is neither too large nor too small.

In a case where the voltage amplitude $|v_{dq}*|$ is larger than the first voltage limit value $V_{lim1}$, the difference therebetween is negative, so that the d-axis current command $i_d$* changes in the negative direction. On the contrary, in a case where the voltage amplitude $|v_{dq}*|$ is smaller than the first voltage limit value $V_{lim1}$, the difference therebetween is positive, so that the d-axis current command $i_d$* changes in the positive direction. In general, a limiter is appropriately provided for the d-axis current command $i_d$*. The provision of the limiter prevents the divergence of the integral operation in the integrator 42. The provision of the limiter also prevents the demagnetization of the synchronous motor 1 due to the d-axis current command $i_d$* being excessive. Moreover, a limiter in the positive direction may be provided in order to prevent the passage of the positive d-axis current $i_d$ when the synchronous motor 1 rotates in the low-middle speed region. The limit value in the positive direction is usually set to zero or a "current command value by maximum torque per ampere control".

In order to explain the usefulness of the motor drive apparatus 100 according to the first embodiment, another method widely known as a flux weakening control method will be described. The "positional error command calculation", which is the method described in Patent Literature 1 above, is considered to be a kind of integral flux weakening control. According to the method of flux weakening control described above, the phase angle of the voltage command advances as a result of manipulating the d-axis current command, but a similar effect can be obtained when the phase of the voltage command is directly manipulated. The method of directly manipulating the phase of the voltage command is referred to as "voltage phase control" or the like. It is presumed that the "voltage phase control" is also used in the "positional error command calculation". Another method is known in which, instead of the phase of the voltage command, the phase of control coordinates is shifted in the advancing direction with respect to the magnetic pole position. In the following description, these methods using phase manipulation may be referred to as "phase-manipulating flux weakening control". Every phase-manipulating flux weakening control has a disadvantage in that the mathematical perspective is poor and the calculation for determining the control gain is complicated.

In general, the poor mathematical perspective greatly affects the difficulty of control adjustment. The classical control engineering approach is powerful means for the gain design, but does not work when a plant model or controller includes non-linear elements. A trigonometric function is required for a phase rotating manipulation, but many differential equations including a trigonometric function are non-linear elements. The trigonometric function can be linearly approximated if the amount of phase manipulation is small, but the amount of phase manipulation in flux weakening control changes greatly in the range of zero to 90 degrees, so that it is difficult to perform the linear approximation. It is generally recognized that the discussion of non-linear control is difficult, and the control adjustment is not easy. When an appropriate gain cannot be theoretically found, trial and error experiments are to be repeated to adjust the control gain, which requires a great deal of effort. In that respect, it can be said that the phase-manipulating flux weakening control is an unfavorable method.

In the motor drive apparatus 100 according to the first embodiment, the "d-axis current command-manipulating flux weakening control" enables the gain design to be performed easily as compared to the "phase-manipulating flux weakening control". The gain design in the "d-axis current command-manipulating flux weakening control" will be described later.

Figure 5:
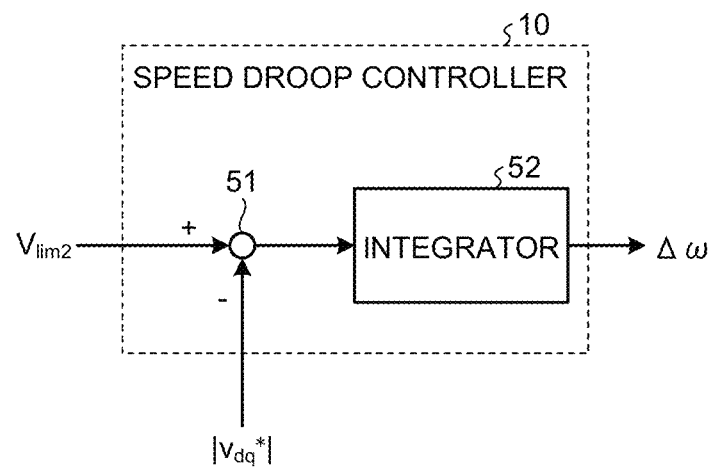
FIG. 5 is a block diagram illustrating an example of a configuration of a speed droop controller included in the motor drive apparatus according to the first embodiment.

FIG. 5 is a block diagram illustrating an example of a configuration of the speed droop controller included in the motor drive apparatus according to the first embodiment. Here, a description will be made of a configuration assumed to be applied to an application that performs only power running operation in forward rotation such as the refrigerant compressor. It is of course possible that the speed droop controller 10 has a configuration in consideration of reverse rotation or regenerative operation.

The speed droop controller 10 includes a subtractor 51 and an integrator 52 with a limiter. The subtractor 51 outputs a difference obtained by subtracting the voltage amplitude $|v_{dq}^*|$ from the second voltage limit value $V_{lim2}$. The integrator 52 obtains the speed droop amount $\Delta\omega$ by integrating a result of multiplying the difference by a control gain (not illustrated). Since the speed droop controller 10 is a controller that integrates the difference between the second voltage limit value $V_{lim2}$ and the voltage amplitude $|v_{dq}^*|$, the motor drive apparatus 100 can automatically adjust the speed droop amount $\Delta\omega$ to an appropriate value that is neither too large nor too small.

In a case where the voltage amplitude $|v_{dq}^*|$ is larger than the second voltage limit value $V_{lim2}$, the difference therebetween is negative, so that the speed droop amount $\Delta\omega$ changes in the negative direction. On the contrary, in a case where the voltage amplitude $|v_{dq}^*|$ is smaller than the second voltage limit value $V_{lim2}$, the difference therebetween is positive, so that the speed droop amount $\Delta\omega$ changes in the positive direction. The integrator 52 limits the range that the speed droop amount $\Delta\omega$ can take by a limiter such that the integration operation does not diverge. By setting an upper limit value of the speed droop amount $\Delta\omega$ to zero, the motor drive apparatus 100 can prevent the synchronous motor 1 from decelerating under a condition that voltage saturation does not occur. That is, the speed droop controller 10 adjusts the speed droop amount $\Delta\omega$ such that the voltage amplitude $|v_{dq}^*|$ does not exceed the second voltage limit value $V_{lim2}$. The speed droop controller 10 thus determines the speed droop amount $\Delta\omega$ that causes the voltage amplitude $|v_{dq}^*|$ to be smaller than the second voltage limit value $V_{lim2}$.

An appropriate value need only be set as a lower limit value of the speed droop amount $\Delta\omega$. The description here assumes the case where voltage saturation occurs in the high-speed region, so that it is sufficient in many cases if, for example, the lower limit value of the speed droop amount $\Delta\omega$ is set to a value that is about −10% to −20% of the maximum speed $\omega_{Max}$ of the synchronous motor 1. As described above, in the power running operation in the forward rotation, the range that the speed droop amount $\Delta\omega$ can take is $0 \geq \Delta\omega \geq -0.2\omega_{Max}$.

On the basis of the speed droop amount $\Delta\omega$ thus obtained, the speed controller 6 reduces the speed command $\omega_1^*$ and determines the second speed command $\omega_2^*$. In a case where serious voltage saturation occurs such as when a load torque larger than the maximum torque that the synchronous motor 1 can output is applied to the synchronous motor 1, the motor drive apparatus 100 eases the voltage saturation by reducing the speed command $\omega_1^*$. By configuring the flux weakening controller 9 and the speed droop controller 10 as described above, the gain design of the flux weakening controller 9 and the speed droop controller 10 can be performed very easily.

Figure 6:
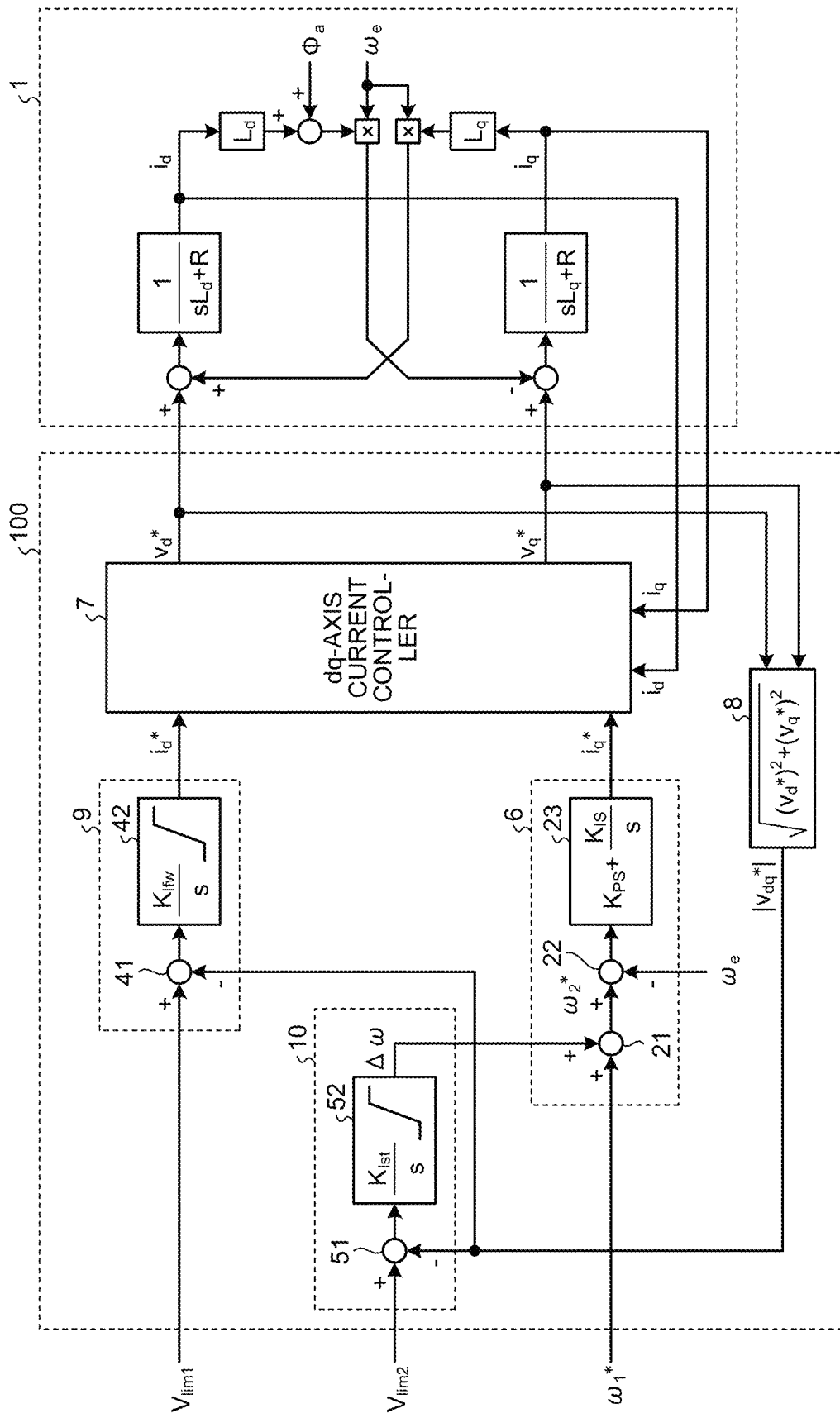
FIG. 6 is a diagram illustrating an example of a control model of the motor drive apparatus and the synchronous motor according to the first embodiment.

Next, the design of the gain in the motor drive apparatus 100 will be described with reference to FIGS. 6 to 15. FIG. 6 is a diagram illustrating an example of a control model of the motor drive apparatus and the synchronous motor according to the first embodiment. FIG. 6 illustrates details of a controller model of the motor drive apparatus 100 and an electric plant model of the synchronous motor 1. Here, the control design for specifically determining a flux weakening control gain $K_{Ifw}$ of the flux weakening controller 9 and a speed droop gain $K_{Ist}$ of the speed droop controller 10 will be described.

Figure 7:
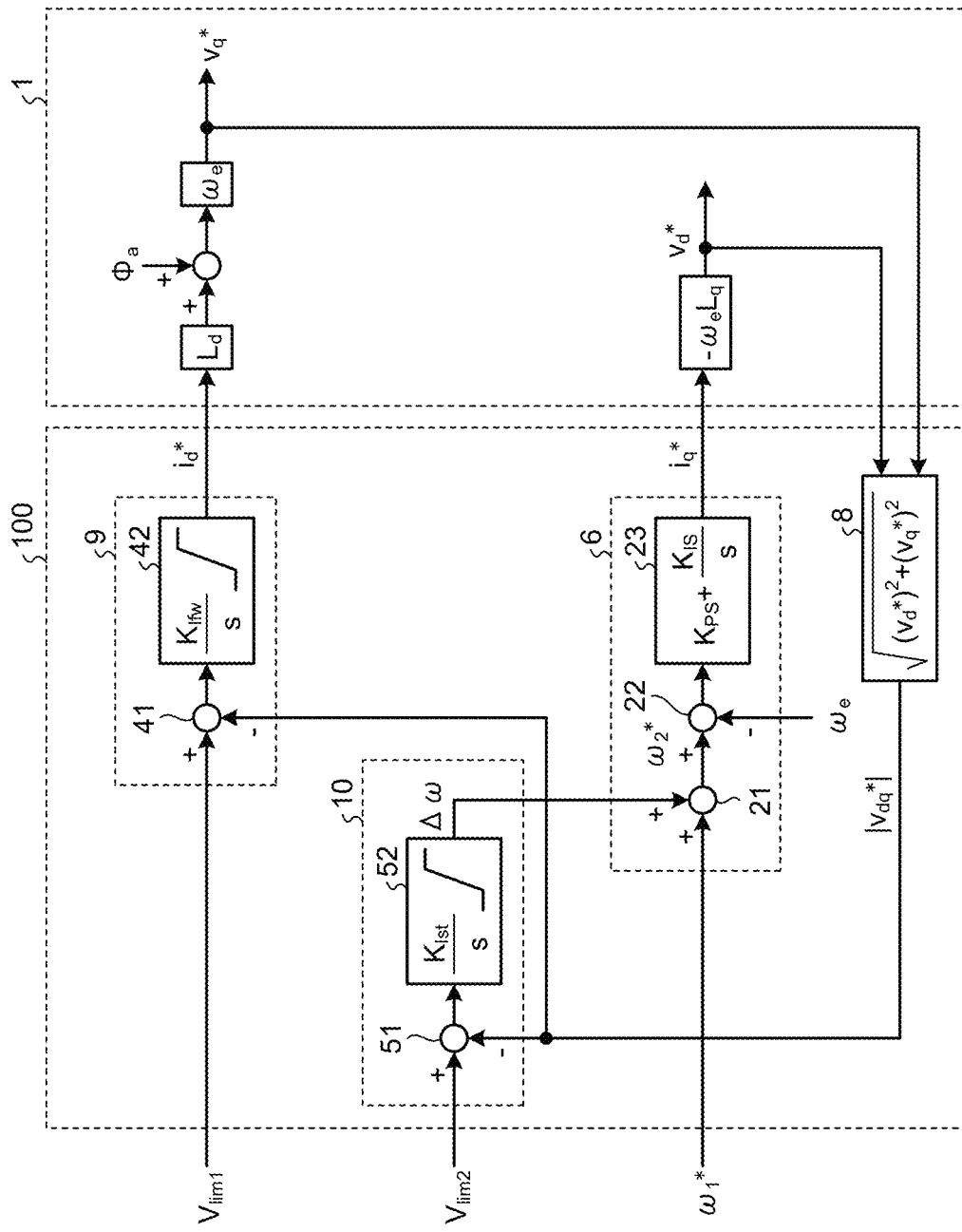
FIG. 7 is a diagram illustrating a model that approximates the control model illustrated in FIG. 6 in the vicinity of an operating point in a high-speed region.

FIG. 7 is a diagram illustrating a model that approximates the control model illustrated in FIG. 6 in the vicinity of an operating point in the high-speed region. In a case where the control response of the dq-axis current controller 7 is determined to be sufficiently high as compared to the control response of the speed controller 6, the flux weakening controller 9, and the speed droop controller 10, it can be considered that the d-axis current command $i_d^*$ substantially matches the d-axis current $i_d$ and that the q-axis current command $i_q^*$ substantially matches the q-axis current $i_q$. It is also assumed that the rotational speed $\omega_e$ changes gradually near the operating point. Furthermore, it is assumed that the rotational speed $\omega_e$ is sufficiently high, and a voltage drop due to armature resistance R is very small and negligible. Under these conditions, the control model illustrated in FIG. 6 can be simplified and expressed as in FIG. 7.

Figure 8:
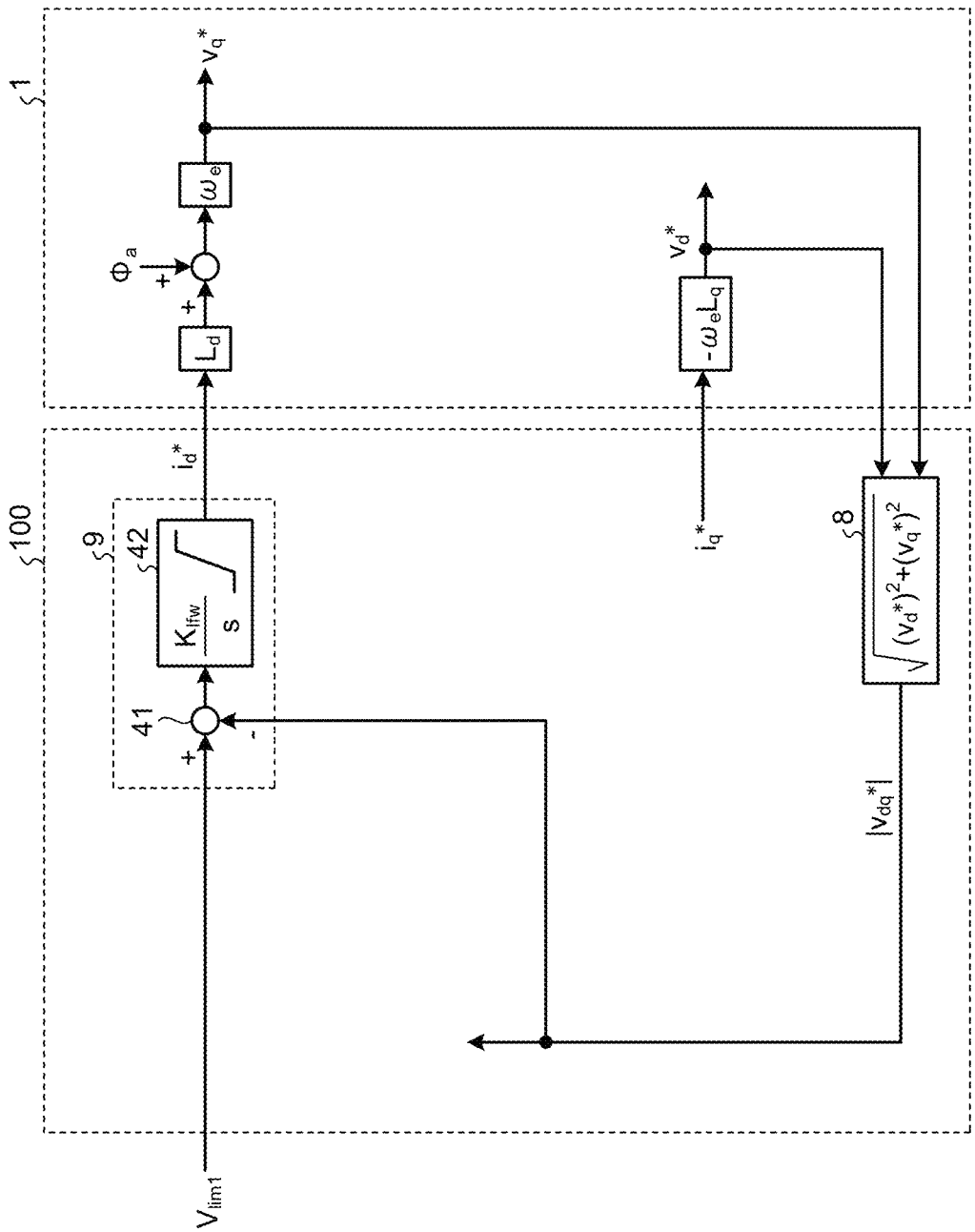
FIG. 8 is a first diagram for explaining the design of a flux weakening control gain of the flux weakening controller illustrated in FIG. 4.
Figure 9:
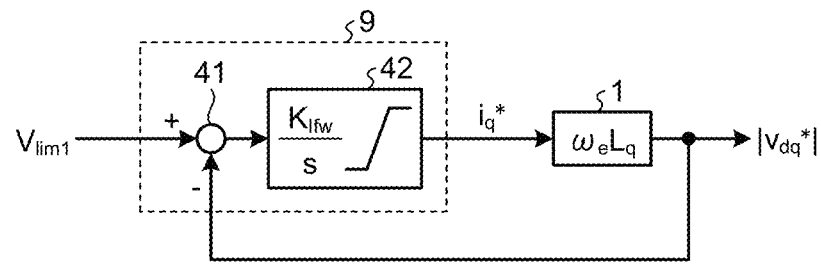
FIG. 9 is a second diagram for explaining the design of the flux weakening control gain of the flux weakening controller illustrated in FIG. 4.
Figure 10:
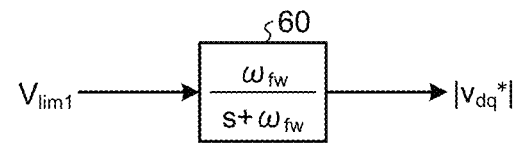
FIG. 10 is a third diagram for explaining the design of the flux weakening control gain of the flux weakening controller illustrated in FIG. 4.
Figure 11:
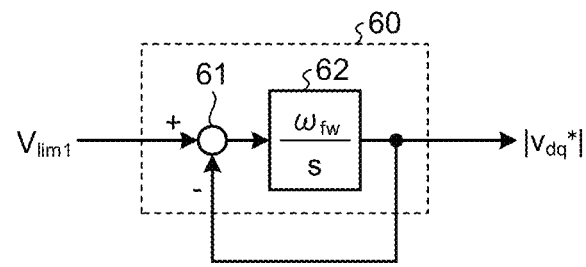
FIG. 11 is a fourth diagram for explaining the design of the flux weakening control gain of the flux weakening controller illustrated in FIG. 4.

Here, the design of the flux weakening control gain $K_{Ifw}$, which is the control gain of the flux weakening controller, will be described. FIG. 8 is a first diagram for explaining the design of the flux weakening control gain of the flux weakening controller illustrated in FIG. 4. FIG. 9 is a second diagram for explaining the design of the flux weakening control gain of the flux weakening controller illustrated in FIG. 4. FIG. 10 is a third diagram for explaining the design of the flux weakening control gain of the flux weakening controller illustrated in FIG. 4. FIG. 11 is a fourth diagram for explaining the design of the flux weakening control gain of the flux weakening controller illustrated in FIG. 4.

The block diagram illustrated in FIG. 8 can be obtained by omitting the speed droop controller 10 and the speed controller 6 from the model illustrated in FIG. 7. Here, a transfer function for obtaining the voltage amplitude $|v_{dq}^*|$ on the basis of the first voltage limit value $V_{lim1}$ will be considered. Since the transfer function is a function expressed as single input and single output, input elements other than the first voltage limit value $V_{lim1}$ are considered to be constant near the operating point. That is, the q-axis current command $i_q^*$ and the dq-axis flux linkage $\Phi_d$ are ignored. Under such conditions, the block diagram illustrated in FIG. 9 can be obtained from the block diagram illustrated in FIG. 8.

The block diagram illustrated in FIG. 10 represents a normative model of the flux weakening controller 9 based on the block diagram illustrated in FIG. 9. It is desirable that the flux weakening controller 9 be designed such that the voltage amplitude $|v_{dq}^*|$ appropriately follows a change in the first voltage limit value $V_{lim1}$. It is also desirable that the speed until the response converges be specified using a freely selected time constant. Therefore, the normative model of the flux weakening controller 9 should be a first-order low-pass filter 60. The low-pass filter 60 has a cutoff angular frequency $\omega_{fw}$. The cutoff angular frequency is a reciprocal of the time constant.

It is clear that the low-pass filter 60 illustrated in FIG. 10 is equivalent to the configuration illustrated in FIG. 11 by a simple modification. The low-pass filter 60 illustrated in FIG. 11 includes a subtractor 61 and an integrator 62. The flux weakening controller 9 can obtain desired response characteristics by designing the flux weakening control gain $K_{Ifw}$ such that the open-loop transfer function in the block diagram illustrated in FIG. 9 matches the open-loop transfer function in the block diagram illustrated in FIG. 11. Therefore, the flux weakening control gain $K_{Ifw}$ is determined by the following expression (5).

[Expression 5]

$$K_{Ifw} = \frac{\omega_{fw}}{\omega_e L_d} \quad (5)$$

Figure 12:
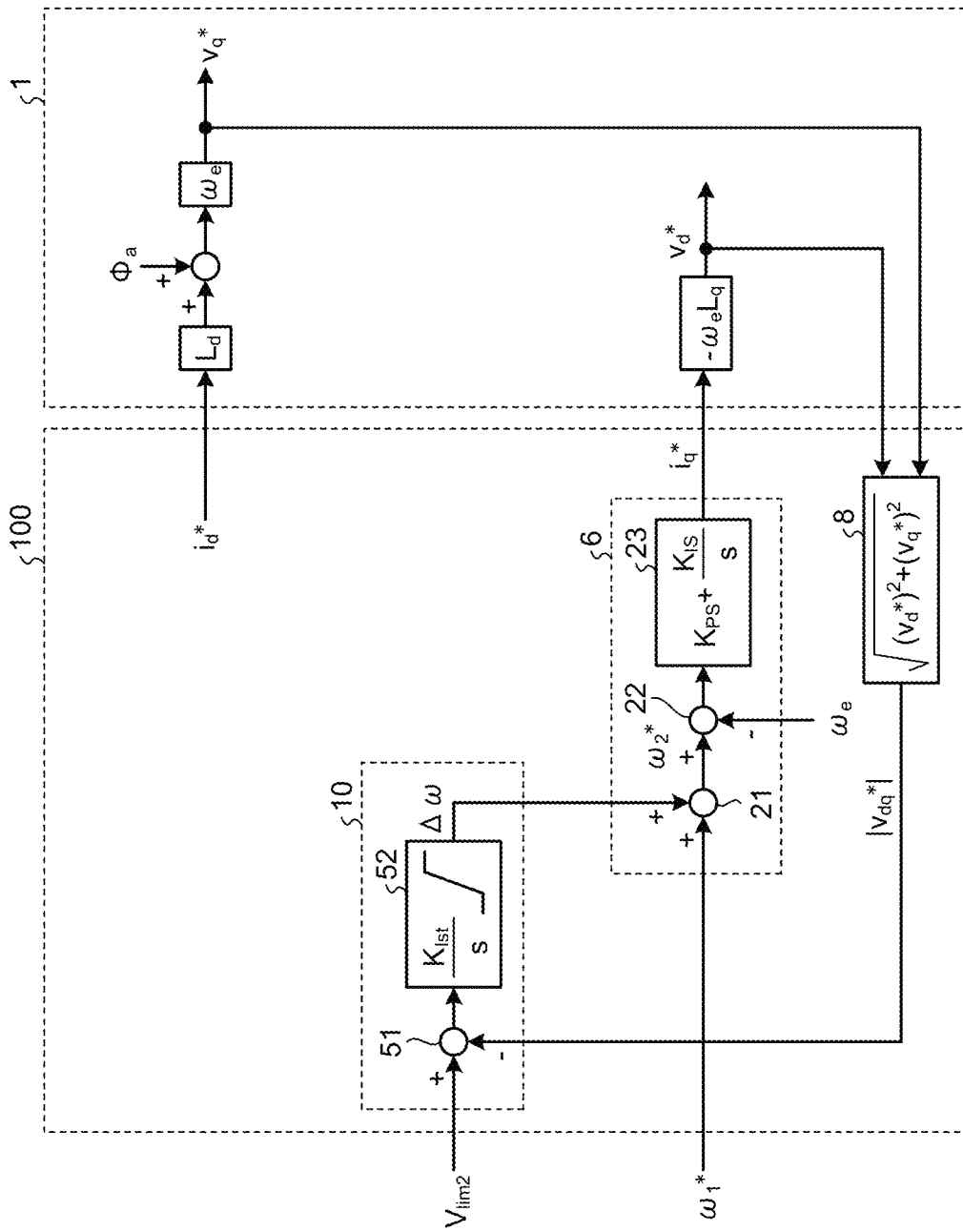
FIG. 12 is a first diagram illustrating the design of a speed droop control gain of the speed droop controller illustrated in FIG. 5.
Figure 13:
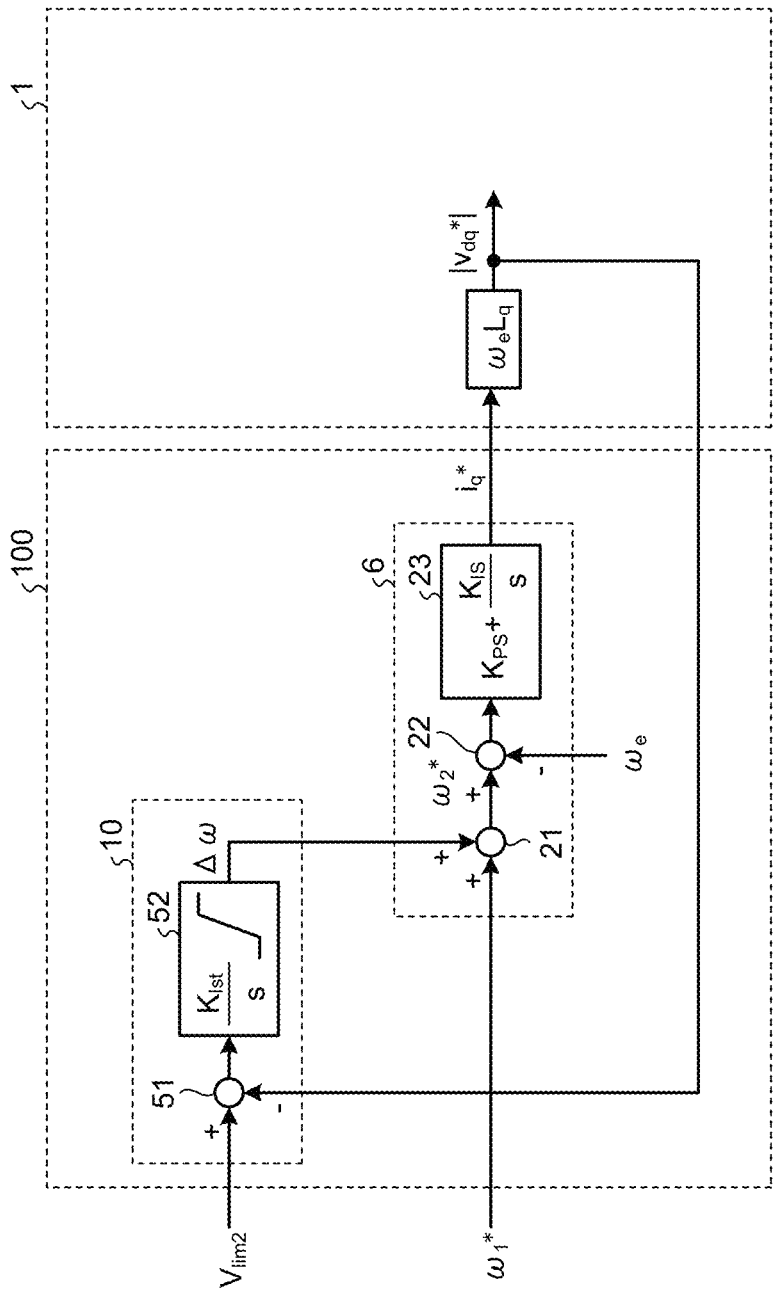
FIG. 13 is a second diagram illustrating the design of the speed droop control gain of the speed droop controller illustrated in FIG. 5.
Figure 14:
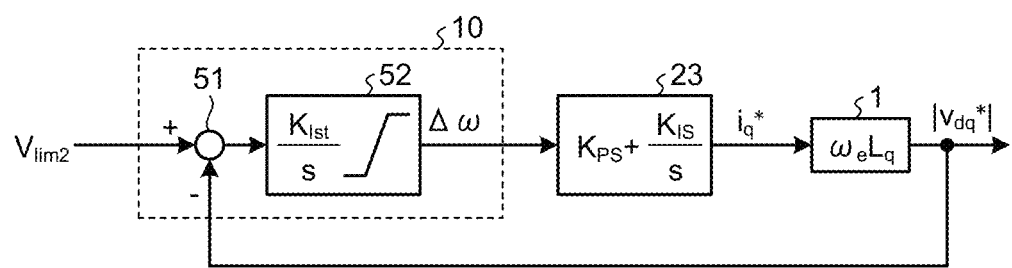
FIG. 14 is a third diagram illustrating the design of the speed droop control gain of the speed droop controller illustrated in FIG. 5.
Figure 15:
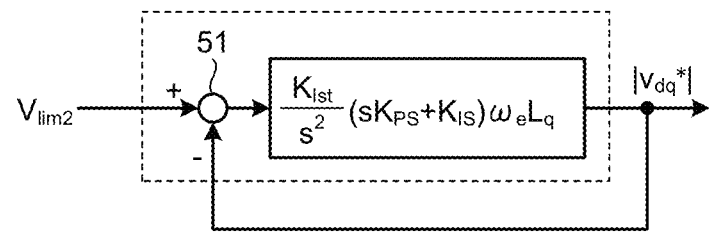
FIG. 15 is a fourth diagram illustrating the design of the speed droop control gain of the speed droop controller illustrated in FIG. 5.

Next, the design of the speed droop control gain, which is the control gain of the speed droop controller 10, will be described. FIG. 12 is a first diagram illustrating the design of the speed droop control gain of the speed droop controller illustrated in FIG. 5. FIG. 13 is a second diagram illustrating the design of the speed droop control gain of the speed droop controller illustrated in FIG. 5. FIG. 14 is a third diagram illustrating the design of the speed droop control gain of the speed droop controller illustrated in FIG. 5. FIG. 15 is a fourth diagram illustrating the design of the speed droop control gain of the speed droop controller illustrated in FIG. 5. The speed droop control gain is determined on the basis of a transfer function of the speed controller 6 and a transfer function of the synchronous motor 1.

The block diagram illustrated in FIG. 12 can be obtained by omitting the flux weakening controller 9 from the model illustrated in FIG. 7. Here, a transfer function for obtaining the voltage amplitude $|v_{dq}^*|$ on the basis of the second voltage limit value $V_{lim2}$ will be considered. Since the transfer function is a function expressed as single input and single output, input elements other than the second voltage limit value $V_{lim2}$ are considered to be constant near the operating point. That is, the d-axis current command $i_d^*$ and the dq-axis flux linkage $\Phi_a$ are ignored. Under such conditions, the block diagram illustrated in FIG. 13 can be obtained from the block diagram illustrated in FIG. 12.

Moreover, the block diagram illustrated in FIG. 14 can be obtained by modifying the block diagram illustrated in FIG. 13. The block diagram illustrated in FIG. 14 includes a transfer function of the speed FB controller 23. Here, the gain design of the speed FB controller 23 will be described first.

As a method of designing a proportional gain $K_{PS}$ of the speed FB controller 23, for example, a method using the following expression (6) is known. As a method of designing an integral gain $K_{IS}$ of the speed FB controller 23, for example, a method using the following expression (7) is known.

[Expression 6]

$$K_{PS} = \frac{J}{P_m^2 \Phi_a} \omega_{sc} \quad (6)$$

[Expression 7]

$$K_{IS} = K_{PS} \omega_{PI} \quad (7)$$

In the expressions, "J" represents inertia, "$P_m$" represents a pole logarithm, "$\omega_{SC}$" represents a speed control band, and "$\omega_{PI}$" represents a PI breakpoint angular frequency. When "$\omega_{PI}$" and "$\omega_{SC}$" are determined with a policy that a target value response is determined on the proportional control side and the integral control is operated only to make the steady-state error zero, "$\omega_{PI}$" is preferably set to one fifth or less of "$\omega_{SC}$".

An open-loop transfer function $G_O(s)$ in the block diagram illustrated in FIG. 14 is expressed by the following expression (8). Therefore, the block diagram illustrated in FIG. 14 can be modified as the block diagram illustrated in FIG. 15.

[Expression 8]

$$G_O(s) = \frac{K_{Ist}}{s^2}(sK_{PS} + K_{IS})\omega_e L_q \quad (8)$$

A closed-loop transfer function $G_C(s)$ in the block diagram illustrated in FIG. 15 is expressed by the following expression (9). In expression (9), the degree of a complex number "s" of a transfer function parameter is two.

[Expression 9]

$$G_c(s) = \frac{sK_{Ist}K_{PS}\omega_e L_q + K_{Ist}K_{IS}\omega_e L_q}{s^2 + sK_{Ist}K_{PS}\omega_e L_q + K_{Ist}K_{IS}\omega_e L_q} \quad (9)$$

A general expression for a transfer function of a second-order lag system is expressed by the following expression (10). In the expression, "$\zeta$" represents a damping coefficient, and "$\omega_n$" represents a natural angular frequency.

[Expression 10]

$$\frac{K\omega_n^2}{s^2 + 2\zeta\omega_n s + \omega_n^2} \quad (10)$$

By comparing the coefficient of the denominator in expression (9) and the coefficient of the denominator in expression (10), the speed droop gain $K_{Ist}$ that allows the natural angular frequency $\omega_n$ of the speed droop controller 10 to take a freely selected value can be determined by the following expression (11).

[Expression 11]

$$K_{Ist} = \frac{\omega_n^2}{K_{IS}\omega_e L_q} \quad (11)$$

Note that the damping coefficient $\zeta$ of the speed droop controller 10 is expressed by the following expression (12).

[Expression 12]

$$\zeta = \frac{\omega_n}{2\omega_{PI}} \quad (12)$$

In a case where the damping coefficient $\zeta$ is not appropriate, the speed droop control by the speed droop controller 10 becomes unstable. When the damping coefficient $\zeta$ is less than 0.5, the fluctuation of the speed droop amount Δω until the speed droop amount Δω converges is noticeable. It is thus desirable that the damping coefficient ζ be at least 0.5 or more. Note that since it is clear that $\omega_n>0$ and $\omega_{Pf}>0$, the damping coefficient ζ is always a positive value. Therefore, it can be said that the transfer function expressed in the above expression (9) is stable.

It is difficult to perform the gain design in the case of the control configuration that performs a flag determination as to whether or not the voltage is saturated and performs processing of dropping the speed command as in Patent Literature 1 described above. On the other hand, according to the first embodiment, the clear gain design as described above is possible by configuring the control system as illustrated in FIG. 1.

Figure 16:
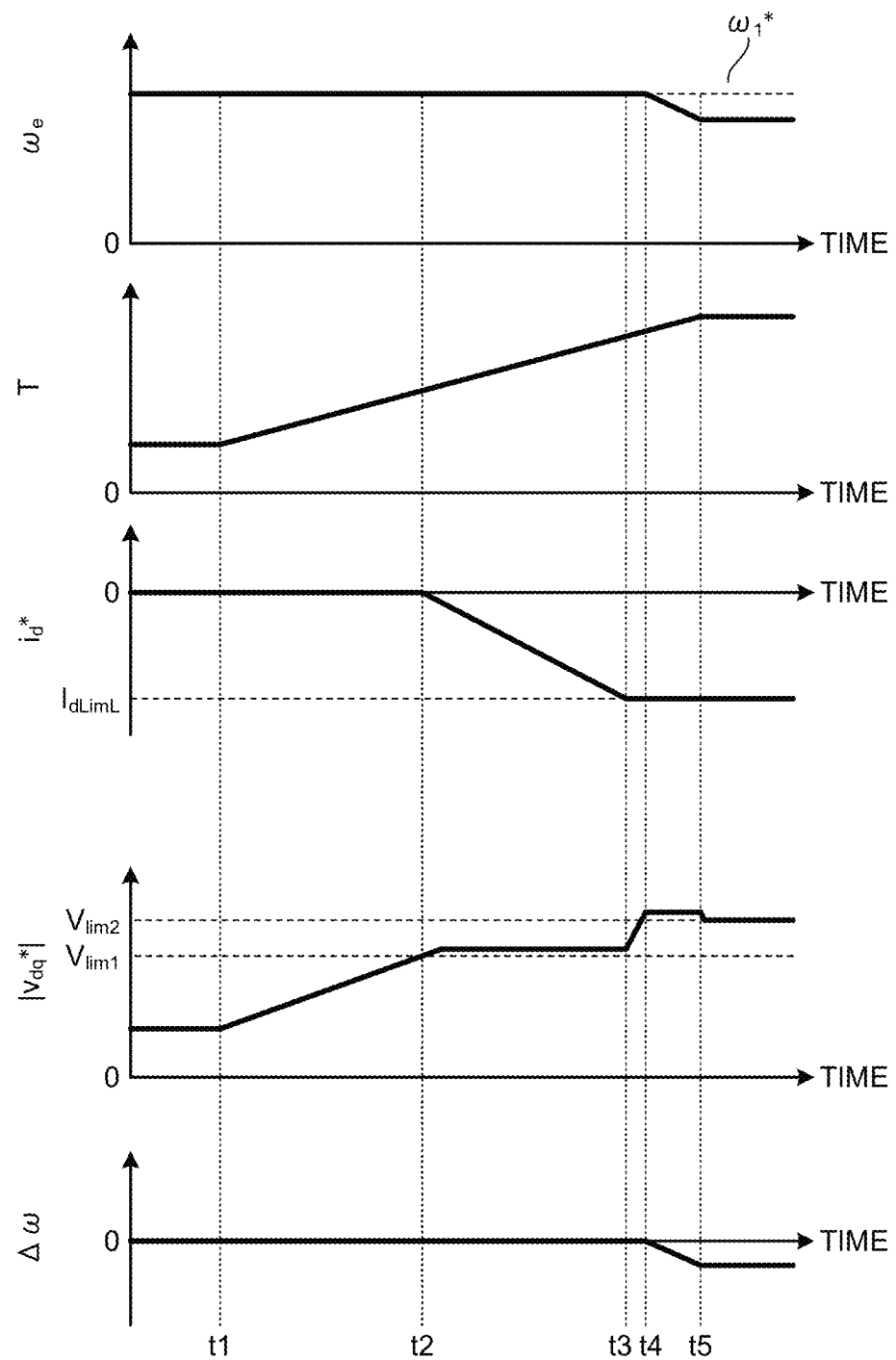
FIG. 16 is a graph illustrating an example of operating waveforms when the motor drive apparatus according to the first embodiment is used.

FIG. 16 is a graph illustrating an example of operating waveforms when the motor drive apparatus according to the first embodiment is used. FIG. 16 graphically illustrates an example of the relationship between each of the rotational speed $\omega_e$, a load torque T, the d-axis current command $i_d{}^*$, the voltage amplitude $|v_{dq}{}^*|$, and the speed droop amount Δω and time.

It is assumed that the load torque T is gradually increased from time t1 to time t5 as illustrated in FIG. 16 when the synchronous motor 1 rotates at a constant speed. In the period up to the time t2, the voltage amplitude $|v_{dq}{}^*|$ is smaller than the first voltage limit value $V_{lim1}$, and thus the d-axis current command $i_d{}^*$ is zero. At time t2, the voltage amplitude $|v_{dq}{}^*|$ exceeds the first voltage limit value $V_{lim1}$. Then, the integral flux weakening controller 9 increases the d-axis current command $i_d{}^*$ in the negative direction so that the voltage amplitude $|v_{dq}{}^*|$ does not increase any more.

It is assumed that the d-axis current command $i_d{}^*$ is increased in the negative direction to reach a lower limit value $I_{dLimL}$ at time t3. The lower limit value $I_{dLimL}$ is set to protect the synchronous motor 1 from demagnetization, heat generation, and the like. The d-axis current $i_d$ exceeding the lower limit value $I_{dLimL}$ cannot be passed through the synchronous motor 1. Therefore, after time t3, the speed command $\omega_1{}^*$ needs to be lowered in order to ease the voltage saturation.

In FIG. 16, the second voltage limit value $V_{lim2}$ is set to a value higher than the first voltage limit value $V_{lim1}$. The voltage amplitude $|v_{dq}{}^*|$ increases during the period from time t3 to time t4 and reaches the second voltage limit value $V_{lim2}$ at time t4, and the speed droop amount Δω starts to be generated. During the period from time t4 to time t5, the rotational speed $\omega_e$ decreases due to the generation of the speed droop amount Δω, and the voltage amplitude $|v_{dq}{}^*|$ stops increasing. After time t5, the load torque T is constant so that the rotational speed $\omega_e$ stops decreasing.

In the first embodiment, the first voltage limit value $V_{lim1}$ and the second voltage limit value $V_{lim2}$ are set separately and the second voltage limit value $V_{lim2}$ is higher than the first voltage limit value $V_{lim1}$, whereby the motor drive apparatus 100 shifts the operation timing of the flux weakening control and the operation timing of the speed droop control from each other. As a result, the motor drive apparatus 100 can increase the output torque of the synchronous motor 1 by making the best use of the flux weakening control.

Note that in the case of increasing the maximum torque and reducing copper loss by utilizing an overmodulation region of the power converter 3, the first voltage limit value $V_{lim1}$ and the second voltage limit value $V_{lim2}$ can be set within a range expressed by the following expression (13). As a result, the motor drive apparatus 100 can use the output limit range of the synchronous motor 1 to the fullest by controlling the speed droop amount Δω after the limitation of the voltage amplitude by the flux weakening control is no longer effective.

[Expression 13]

$$V_{lim2}>V_{lim1}\geq V_{DC}/\sqrt{2}\ldots \quad (13)$$

According to the first embodiment, the motor drive apparatus 100 can prevent a phenomenon in which the control of the synchronous motor 1 becomes unstable at the time of voltage saturation without performing complicated work for the control adjustment. In applications to a refrigerant compressor or the like, labor saving in the control adjustment is a great advantage. Furthermore, the motor drive apparatus 100 can increase the maximum torque and reduce the copper loss by utilizing the overmodulation region of the power converter 3. As described above, the motor drive apparatus 100 has the effect that the workload required for the adjustment to perform stable control on the motor can be reduced.

Second Embodiment

Figure 17:
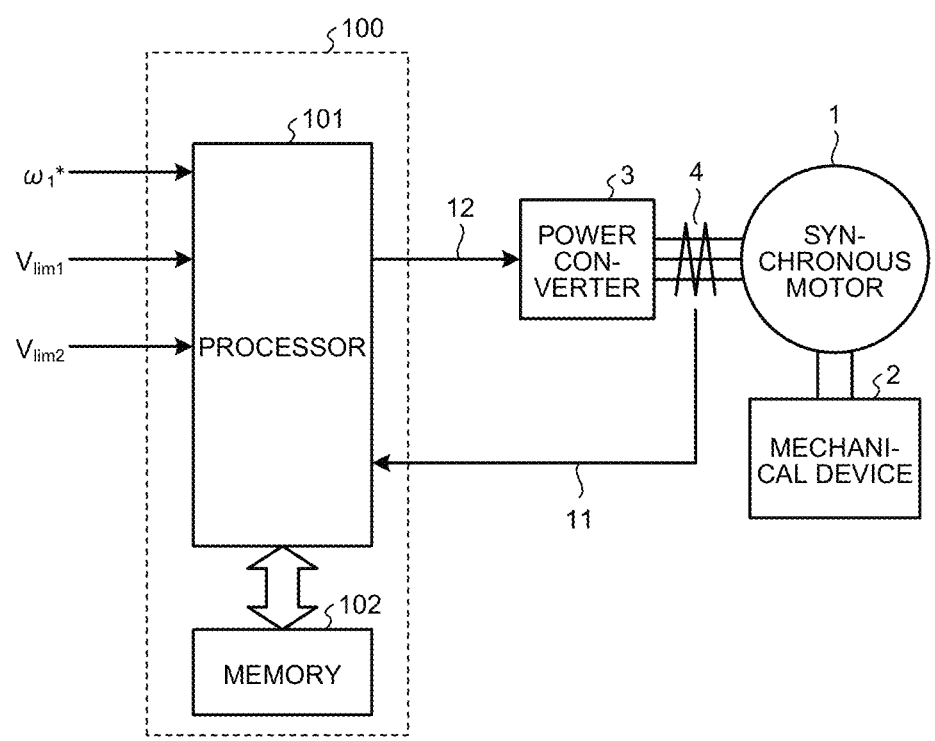
FIG. 17 is a diagram illustrating an example of a hardware configuration of a motor drive apparatus according to a second embodiment of the present invention.

In a second embodiment, a hardware configuration of the motor drive apparatus 100 will be described. FIG. 17 is a diagram illustrating an example of the hardware configuration of the motor drive apparatus according to the second embodiment of the present invention. In the second embodiment, components identical to those in the first embodiment are denoted by the same reference numerals as those assigned to the corresponding components in the first embodiment. FIG. 17 illustrates the synchronous motor 1, the power converter 3, and the current detection unit 4 that are included in the motor system and the mechanical device 2 that operates with the synchronous motor 1 as the power source, together with the motor drive apparatus 100.

The motor drive apparatus 100 includes a processor 101 and a memory 102 as the hardware configuration. The functions of the position/speed specifying unit 5, the speed controller 6, the dq-axis current controller 7, the voltage amplitude calculating unit 8, the flux weakening controller 9, and the speed droop controller 10 illustrated in FIG. 1 are implemented by the processor 101 executing a program stored in the memory 102.

The processor 101 is a central processing unit (CPU), a processing unit, an arithmetic unit, a microprocessor, a microcomputer, or a digital signal processor (DSP). The memory 102 includes a volatile storage device such as a random access memory and a nonvolatile auxiliary storage device such as a flash memory. The memory 102 may include an auxiliary storage device such as a hard disk instead of the nonvolatile auxiliary storage device. The illustration of the volatile storage device and the auxiliary storage device is omitted. The processor 101 reads the program stored in the auxiliary storage device via the volatile storage device. The processor 101 outputs data such as a calculation result to the volatile storage device. The processor 101 may save the data in the auxiliary storage device via the volatile storage device.

Various modes have been studied for the power converter 3 and the current detection unit 4, but basically any mode may be used therefor. The motor system may be provided with voltage detecting means that detects an input voltage or output voltage of the power converter 3 or voltage detecting means that detects a direct current bus voltage.

Basically, any method may be used as a method of transmitting and receiving data between the components.

Each component may transmit and receive a digital signal, or may transmit and receive an analog signal. The digital signal may be communicated by parallel communication or serial communication. The analog signal and the digital signal may be converted as appropriate by a converter (not illustrated). For example, in a case where the phase current detected by the current detection unit 4 is expressed by an analog signal, the analog signal is converted into a digital signal by a digital to analog (D/A) converter (not illustrated), and data is transmitted to the processor 101. The D/A converter (not illustrated) may be provided inside the motor drive apparatus 100 or inside the current detection unit 4.

The signal of the voltage command transmitted from the processor 101 to the power converter 3 may be either an analog signal or a digital signal. Moreover, the processor 101 may include a modulation unit such as a carrier comparison modulation unit or a space vector modulation unit. The processor 101 may transmit the voltage command, which is a pulse train obtained after modulation, to the power converter 3. In a case where the voltage detecting means that detects the input voltage or the output voltage of the power converter 3 or the voltage detecting means that detects the direct current bus voltage is provided, basically, any method may be used as a method of transmission and reception between the voltage detecting means and the motor drive apparatus 100. In a case where the position sensor is attached to the synchronous motor 1, basically, any method may be used as a method of transmission and reception between the position sensor and the motor drive apparatus 100.

The processor 101 determines the voltage command 12 by performing speed control calculation and current control calculation on the basis of the speed command $\omega_1^*$. When the amplitude of the voltage command 12 exceeds the first voltage limit value $V_{lim1}$, the flux weakening control operates, and when the amplitude of the voltage command 12 exceeds the second voltage limit value $V_{lim2}$, the speed droop control operates.

The speed command $\omega_1^*$, the first voltage limit value $V_{lim1}$, and the second voltage limit value $V_{lim2}$ are given to the motor drive apparatus 100 from a computer outside the motor drive apparatus 100. The illustration of the computer that gives the speed command $\omega_1^*$, the first voltage limit value $V_{lim1}$, and the second voltage limit value $V_{lim2}$ to the motor drive apparatus 100 is omitted. The speed command $\omega_1^*$, the first voltage limit value $V_{lim1}$, and the second voltage limit value $V_{lim2}$ may be calculated inside the processor 101. Depending on the computing power of the processor 101, the processor 101 may perform calculation processing other than the calculation of the speed command $\omega_1^*$, the first voltage limit value $V_{lim1}$, and the second voltage limit value $V_{lim2}$.

The configuration illustrated in the above embodiment merely illustrates an example of the content of the present invention, and can thus be combined with another known technique or partially omitted and/or modified without departing from the scope of the present invention.

REFERENCE SIGNS LIST 1 synchronous motor; 2 mechanical device; 3 power converter; 4 current detection unit; 5 position/speed specifying unit; 6 speed controller; 7 dq-axis current controller; 8 voltage amplitude calculating unit; 9 flux weakening controller; 10 speed droop controller; 11 signal; 12 voltage command; 21, 25 adder; 22, 41, 51, 61 subtractor; 23 speed FB controller; 24 speed FF controller; 30 voltage limit circle; 42, 52, 62 integrator; 60 low-pass filter; 100 motor drive apparatus; 101 processor; 102 memory.

The invention claimed is:

1. A motor drive apparatus comprising:
   a current controller to convert a value of a phase current flowing through a motor into values of a d-axis current and a q-axis current that are currents in a dq coordinate system, and control the phase current by determining a voltage command on the basis of the d-axis current and a d-axis current command as well as the q-axis current and a q-axis current command;
   a voltage amplitude calculator to obtain a voltage amplitude that is an amplitude of the voltage command;
   a speed controller to control a rotational speed of the motor by determining the q-axis current command on the basis of a speed command, the rotational speed, and a speed droop amount that reduces the speed command;
   a flux weakening controller to perform flux control to limit an amplitude of a voltage output to the motor, by determining the d-axis current command on the basis of the voltage amplitude and a first voltage limit value; and
   a speed droop controller to control the speed droop amount on the basis of the voltage amplitude and a second voltage limit value, wherein
   the speed droop controller determines the speed droop amount that makes the voltage amplitude smaller than the second voltage limit value.

2. The motor drive apparatus according to claim 1, wherein the second voltage limit value is a value larger than the first voltage limit value.

3. The motor drive apparatus according to claim 1, wherein the speed droop controller is a controller to integrate a difference between the second voltage limit value and the voltage amplitude.

4. The motor drive apparatus according to claim 1, wherein the flux weakening controller is a controller to integrate a difference between the first voltage limit value and the voltage amplitude.

5. The motor drive apparatus according to claim 1, wherein a control gain of the speed droop controller is determined on the basis of a transfer function of the speed controller and a transfer function of the motor.

6. The motor drive apparatus according to claim 2, wherein the speed droop controller is a controller to integrate a difference between the second voltage limit value and the voltage amplitude.

7. The motor drive apparatus according to claim 2, wherein the flux weakening controller is a controller to integrate a difference between the first voltage limit value and the voltage amplitude.

8. The motor drive apparatus according to claim 3, wherein the flux weakening controller is a controller to integrate a difference between the first voltage limit value and the voltage amplitude.

9. The motor drive apparatus according to claim 6, wherein the flux weakening controller is a controller to integrate a difference between the first voltage limit value and the voltage amplitude.

10. The motor drive apparatus according to claim 2, wherein a control gain of the speed droop controller is determined on the basis of a transfer function of the speed controller and a transfer function of the motor.

11. The motor drive apparatus according to claim 3, wherein a control gain of the speed droop controller is determined on the basis of a transfer function of the speed controller and a transfer function of the motor.

12. The motor drive apparatus according to claim 6, wherein a control gain of the speed droop controller is determined on the basis of a transfer function of the speed controller and a transfer function of the motor.

13. The motor drive apparatus according to claim 4, wherein a control gain of the speed droop controller is determined on the basis of a transfer function of the speed controller and a transfer function of the motor.

14. The motor drive apparatus according to claim 7, wherein a control gain of the speed droop controller is determined on the basis of a transfer function of the speed controller and a transfer function of the motor.

15. The motor drive apparatus according to claim 8, wherein a control gain of the speed droop controller is determined on the basis of a transfer function of the speed controller and a transfer function of the motor.

16. The motor drive apparatus according to claim 9, wherein a control gain of the speed droop controller is determined on the basis of a transfer function of the speed controller and a transfer function of the motor.

\* \* \* \* \*